United States Patent [19]

Kreuer et al.

[11] 4,242,306
[45] Dec. 30, 1980

[54] PROCESS AND APPARATUS FOR THE PRODUCTION OF A FOAMABLE MIXTURE FROM AT LEAST TWO FLUID, FOAM FORMING REACTANTS AND AGGREGATES

[75] Inventors: Karl D. Kreuer; Klaus Schulte, both of Leverkusen, Fed. Rep. of Germany

[75] Assignee: Bayer Aktiengesellschaft, Leverkusen, Fed. Rep. of Germany

[21] Appl. No.: 42,683

[22] Filed: May 25, 1979

[30] Foreign Application Priority Data

Jun. 29, 1978 [DE] Fed. Rep. of Germany ....... 2828506

[51] Int. Cl.³ ..................... B01J 19/18; C08G 18/14; C08G 9/00
[52] U.S. Cl. ................................ 422/133; 252/359 E; 261/DIG. 26; 366/150; 422/135; 521/122; 264/45.3; 425/817 R
[58] Field of Search ................................ 422/133, 135; 261/DIG. 26; 366/150; 252/359 E; 425/4 R, 89, 224, 817 R; 264/DIG. 17, 45.3 R

[56] References Cited

U.S. PATENT DOCUMENTS

| 3,681,485 | 8/1972 | Lieberman | 366/180 |
| 3,857,550 | 12/1974 | Kripp | 422/133 X |
| 4,120,923 | 10/1978 | Kloker et al. | 422/133 X |
| 4,132,838 | 1/1979 | Kreuer et al. | 422/133 X |

Primary Examiner—Michael S. Marcus
Attorney, Agent, or Firm—Gene Harsh; Joseph C. Gil

[57] ABSTRACT

The instant invention relates to a process and an apparatus for the production of a foamable mixture from at least two fluid, foam forming reactants and aggregates, in which the aggregate is added to one of the reactants and the resulting preliminary mixture is then mixed with the other reactant.

7 Claims, 3 Drawing Figures

PROCESS AND APPARATUS FOR THE PRODUCTION OF A FOAMABLE MIXTURE FROM AT LEAST TWO FLUID, FOAM FORMING REACTANTS AND AGGREGATES

BACKGROUND OF THE INVENTION

In the production of polyurethane or isocyanurate foams, it is often necessary to add aggregates in order to obtain certain properties in the finished product or in order to be able to utilize waste or to lower the cost of the materials. The aggregates used to lower cost include fillers such as cement, lime, chalk, gypsum, barium sulphate or powdered foam resin produced from size reduced foam waste. The aggregates used for increasing the mechanical strength or fire resistance include, in particular, fibrous materials such as staple glass fibers, ground glass fibers, carbon fibers or other fibers based on inorganic or organic materials. The introduction of the aggregate into the reaction mixture has already been attempted by a wide variety of methods. Difficulties lie in accurate metering in proportion to the reactants, in the avoidance of blockages in the pipes and in the unwanted introduction of air with the bulky aggregates. Uncontrolled introduction of air interferes with the foaming reaction and, in particular, the foam structure of the finished product is impaired by the inclusion of substantial quantities of air.

The object of this invention is a process and an apparatus for the production of a reaction mixture containing aggregates from which fault free finished products can subsequently be produced.

DESCRIPTION OF THE INVENTION

Figure 1:
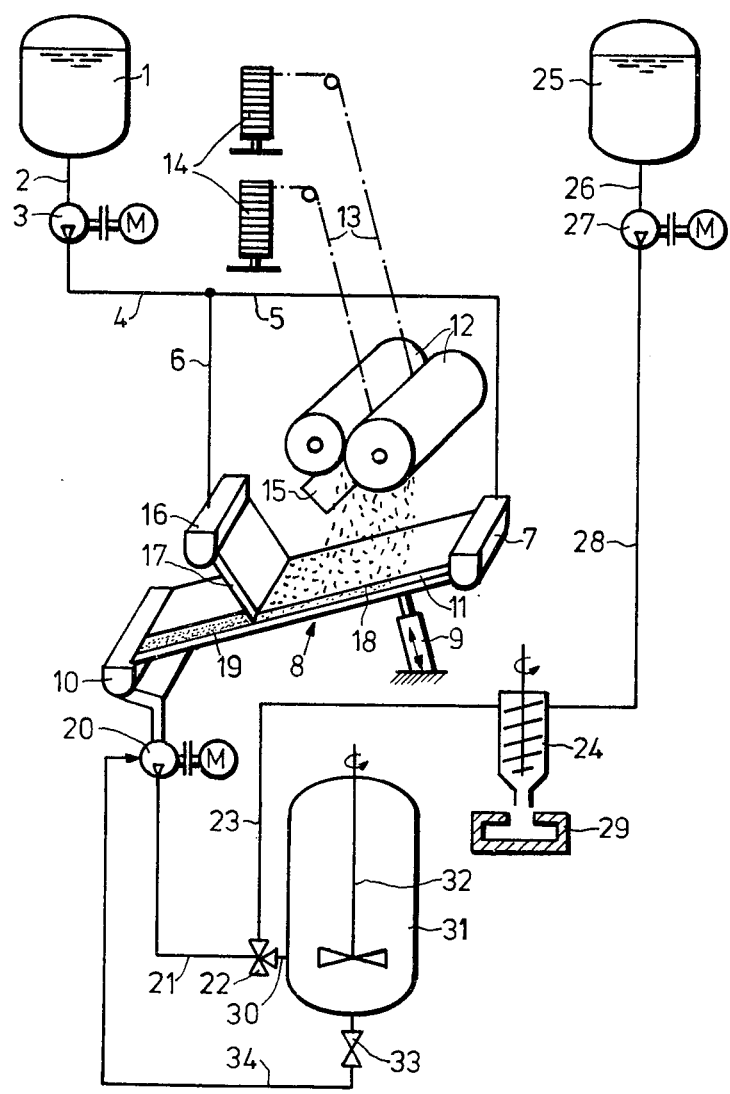
FIG. 1 represents one embodiment of the apparatus in which the mixing device is an inclined surface and a fiber shredding mechanism is used as the metering device for the aggregate.

The above problems are solved by the process according to the invention in that the reactant which is to be mixed with the aggregate is spread out to form a film and the aggregate is applied to this film.

The result thereby achieved is that the aggregate which is composed of fine particles can be homogeneously distributed over the film formed by the reactant. At the same time, the individual particles are separated from each other and penetrate the film so that they become enclosed in the material of the component. The thickness of the film should generally be adjusted to the size of the particles of aggregate so that it is at least equal to the diameter of the particles. By the time the film charged with aggregate is collected up again into a stream and introduced into the mixing head, any air adhering to the individual particles is able to escape from the film into the atmosphere.

The film is advantageously carried on an inclined plane. This has the advantage that the film moves under the influence of gravity and that the velocity of flow can be influenced by the angle of inclination of the plane, which is preferably adjustable. In particular, the angle can be adjusted so that a rolling effect on the particles is produced, i.e. the material of the surrounding component becomes wrapped round the particles.

In one particular embodiment of the process according to the invention, a second film of the reactant is placed on the aggregate after the aggregate has been applied to the first film. This measure is particularly suitable if the proportion of aggregate is exceptionally high but the additional effort is only worth while if a single film would not be able to have the thickness of the particles of aggregates.

It goes without saying that several aggregates may be applied at the same time. Equally, several layers of aggregates may be applied one after the other and, if desired, a film of reaction mixture may be placed between each of these layers.

For the manufacture of articles of polyurethane of isocyanurate forms, the appregate is preferably introduced into the polyol component although aggregates may, of course, be introduced into both reactants by the method according to the invention in cases where exceptionally large quantities of aggregate are required. An excessive increase in the viscosity of the reactants is thereby avoided.

The apparatus for carrying out the process comprises storage containers for the reactants, pipes leading from the containers to a mixing head by way of metering pumps, a mixing device arranged in one of those pipes, and a feed device opening into the mixing device and connected to a storage apparatus for aggregate via a metering device.

The novel feature of this apparatus is that the mixing device comprises a surface which has a film applicator device arranged at one end, a distributing device associated with the metering device being provided above this surface and a collector being arranged at the other end of the surface, followed by a pump from which the pipe opens into the mixing head. More particularly the apparatus of the instant invention comprises an apparatus for mixing foam forming reactants comprising:

(A) storage containers for said reactants, (B) a first pipe leading from one of said storage containers via metering pumps to a mixing head (C) a second pipe leading from another of said storage containers and connected via a metering pump to a film applicator device, (D) a surface associated with said film applicator device, (E) a collecting device located at one end of said surface downstream of said film applicator device, (F) means located intermediate said film applicator device and said collecting device and located above said surface for applying aggregate to said surface, (G) a third pipe leading from said collecting device via a metering pump to said mixing head.

In contrast with the known apparatus in which the aggregates are introduced into the mixing head either directly or after having been mixed with one of the reactants, the apparatus according to the invention is substantially trouble free. The fact that the mixing apparatus requires no stirrer mechanisms is particularly advantageous. It is possible to make this surface plane and rigid but in this case, the film and the aggregates would have to be applied intermittently and the preliminary mixture would have to be carried to the collecting channel by means of a stripping device after each application. It is much more suitable in practice to arrange this surface at an angle, and this angle is preferably adjustable. In this way, it is possible by suitable adjustment of the angle of inclination to obtain a film which continuously runs down to the collecting apparatus together with the aggregates applied to it.

The surface may be a plane but inclined surface or alternatively it may be in the form of a funnel. It may also be formed as an endless conveyor belt which may be either horizontal or inclined. The film of mixture is applied at the inlet end and the aggregate is applied behind it, and the preliminary mixture is stripped off the conveyor belt at the end.

A second device for application of the film is advantageously provided behind the metering device, viewed in the direction of transport. The advantages already described in connection with the process are thereby achieved.

The film applicator device may consist of, for example, a slot die equal in width to the surface or it may consist of a plurality of spray nozzles. The metering device most suitably used for the aggregates may vary according to the nature of the aggregates, for example in the case of a pulverulent aggregate it is suitable to use a conveyor type weigher or a shaking trough equal in width to the surface which is to be covered. In that case, the metering device also serves as distributing device. On the other hand if, for example, the aggregate consists of endless glass fiber rovings, it is advantageous to use a metering device in the form of a cutter arranged after a distributing device in the form of a chute or a centrifugal plate or the like. For delivering the preliminary mixture into the mixing head, it is particularly suitable to use metering pumps which have been especially protected against wear by abrasive aggregates.

The apparatus according to the invention will now be described with reference to the drawings.

In FIG. 1, a pipe 2 for polyol leads from a storage container 1 to a metering pump 3. The pipe 4 leading from the metering pump 3 branches into pipes 5, 6. The first of these leads to a distributor channel serving as film applicator device 7. This is arranged at the upper end of a mixing device 8 in the form of an inclined surface comprising a plate with lateral boundaries (not shown). Its inclination is adjustable by means of a support 9. A collecting channel 10 is arranged at the lower end of the inclined surface 8.

The polyol component is applied as a thin film 11 to the inclined surface 8 by means of the film applicator device 7 and flows down this surface. A shredder serving as metering device 12 shreds glass fiber rovings 13 which are drawn off yarn spools serving as supply station 14. An inclined adjustable deflecting plate is provided as distributing device 15 below the shredder 12. The short fibers slip over this distributing device 15 to fall on the film 11 and then sink into the film and roll and slide with the film 11 in the direction of the collecting channel 10. The pipe 6 leads to a second film applicator device 16, comprising a trough and an inclined guide plate, by means of which another film 17 is placed on layer 18 consisting of a mixture of short fibers and polyol so that all the short fibers are completely surrounded by polyol and the layer 9 consisting of two united polyol films and homogeneously distributed short fibers slides into the collecting channel 10. From this channel 10, the preliminary mixture travels through a metering pump 20 and pipe 21 to a three way tap 22. A pipe 23 leads to a mixing head 24. This is the path taken by the preliminary mixture if it is to be used immediately. The isocyanate component travels from a storage container 25 along a pipe 26 to a metering pump 27 and from there through another pipe 28 to the mixing head 24 where it is mixed with the preliminary mixture to form the reaction mixture. Finally, the reaction mixture is introduced into a molding tool 29. If the preliminary mixture is to be temporarily stored, it is conveyed through the three way tap 22 and a pipe 30 into a buffer container 31 which is equipped with a stirrer mechanism 32 to prevent separation of the contents into its components. When the reserve store is required for use, once the reserve store is full the three way tap 22 is adjusted to connect pipes 21 and 23. When the molding operation is to be started, the tap 33 at the bottom of the buffer container 31 is opened and the preliminary mixture is returned to the metering pump 20 by way of a pipe 34 to be delivered by this pump into the mixing head 24 by way of pipes 21, 23.

Figure 2:
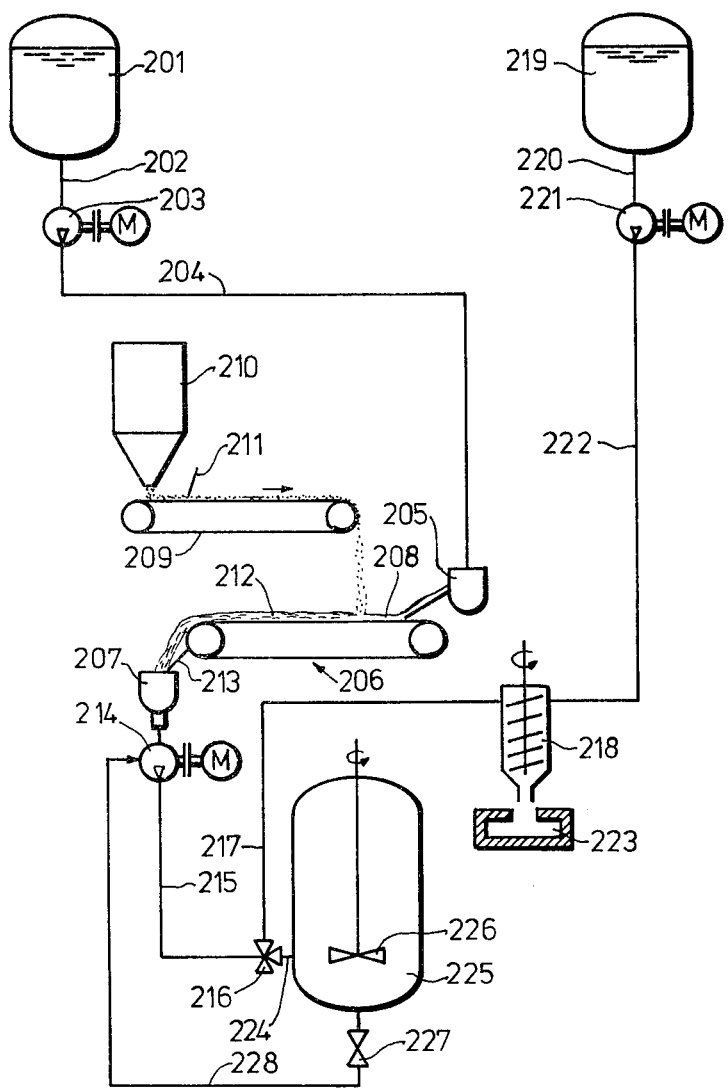
FIG. 2 represents an embodiment of the apparatus comprising an endless conveyor belt as the mixing device and a conveyor type weigher as the metering device for the aggregate.

In FIG. 2, a storage container 201 for polyol is connected to a metering pump 203 by a pipe 202. The pipe 204 extending from the metering pump 203 leads to a distributing device, comprising a through an an inclined guide plate, serving as film applicator device 205. This is arranged at one end of an endless horizontal conveyor belt used as mixing device 206. At the other end of the conveyor belt 206 is arranged a collecting channel 207. The film applicator device 205 applies the polyol component as a thin film 208 to the conveyor belt 206. A conveyor type weigher used as metering device 209 supplies chalk as aggregate in the required proportion. The aggregate is delivered to the conveyor type weigher 209 from a storage container 210. A metal plate serving as distributing device 211 ensures that a layer of uniform thickness is distributed over the width of the weigher 209 which has the same width as the conveyor belt 206. The conveyor type weigher 209 throws the powdered chalk over the polyol film 208 and the chalk sinks into the film and is enclosed by it. Aggregate in surplus is stripped off by the plate 211 and recycled (not shown) to storage container 210. The resulting layer 212 consisting of polyol and homogeneously distributed chalk powder is delivered into the collecting channel 207. The conveyor belt 206 is cleaned by a stripper 213 which scrapes the belt 206 and guides the mixture into collecting channel 207. The polyol/chalk mixture is transferred from the collecting channel 207 to a three way tap 216 by way of a metering pump 214 and a pipe 215. A pipe 217 leads to a mixing head 218. This is the path taken by the mixture if it is to be used immediately. The isocyanate component is transferred from a storage container 219 to a metering pump 221 by way of a pipe 220, and from this pump it travels along a pipe 222 to the mixing head 218 where it is mixed with the preliminary mixture to form the reaction mixture. The finished reaction mixture is finally introduced into a molding tool 233. If the preliminary mixture is to be temporarily stored, it is transferred through the three way tap 216 and pipe 224 into a buffer container 225 which is equipped with a stirrer 226 to prevent separation of the contents into its components. If the buffered reserve supply is required for use, the three way tap 216 is adjusted to connect pipes 215 and 217. The tap 227 at the bottom of the buffer container 225 is opened and the preliminary mixture flows through a pipe 228 to return to the metering pump 214 which delivers it into the mixing head 218 by way of the pipes 215, 217.

Figure 3:
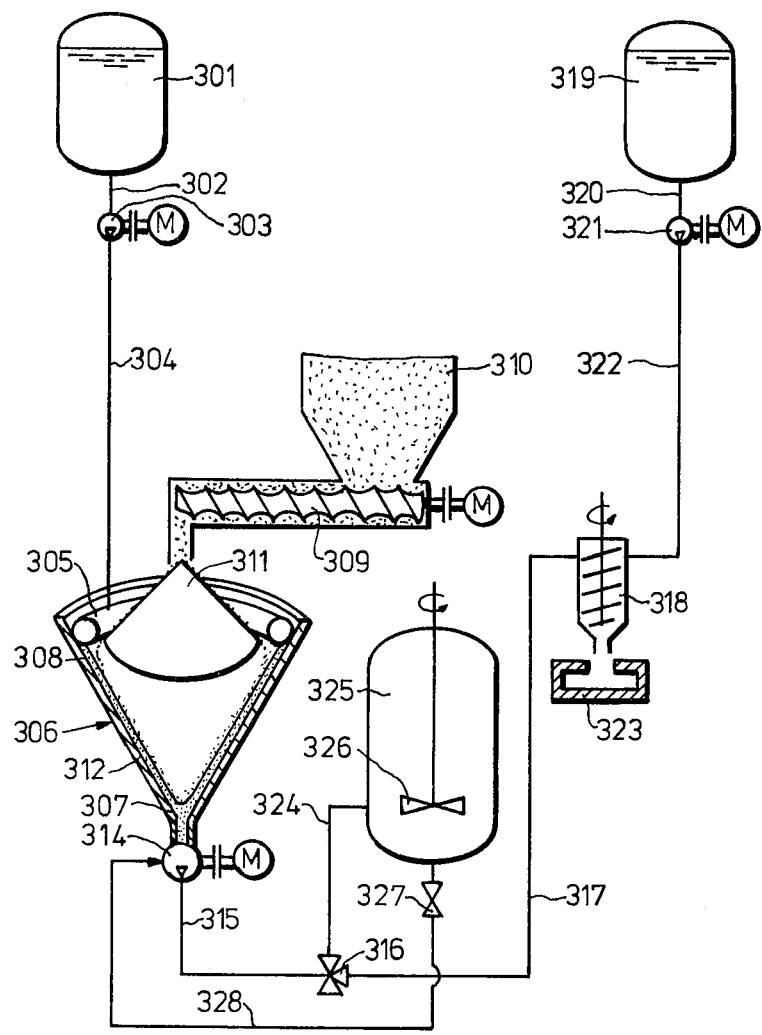
FIG. 3 represents an embodiment of the apparatus having a funnel (shown in section) as the mixing device and a metering screw for the aggregate.

In FIG. 3, a pipe 302 leads from a storage container 301 for polyol to a metering pump 303. The pipe 304 extending from the pump 303 leads to an annular nozzle serving as film applicator device 305. This is arranged at the upper end of a funnel serving as mixing apparatus 306. A collecting pipe 307 is provided at the outflow end of the funnel 306. By means of the film applicator device 305, the polyol component is applied as a thin film 308 to the inclined surface formed by the internal wall of the funnel 306. A conveyor screw provided as metering device 309 delivers powdered barium sulphate as aggregate in the desired proportion. The barium sulphate is supplied to the screw 309 from a storage container 310. At the discharge end of the screw 309, a pyramidal cone serving as distributor device 311 is arranged coaxially with the axis of the funnel 306. The barium sulphate powder, descending under gravity, trickles uniformly over the distributing device 311 from all sides to fall on the film 308 and sinks into the film and rolls and slides together with the polyol as a layer 312 into the collecting pipe 307. From this pipe 307, the preliminary mixture of polyol and barium sulfate reaches a three way tap 316 by way of a metering pump 314 and a pipe 315. A pipe 317 leads to a mixing head 318. This is the path taken by the mixture if it is to be used immediately. The isocyanate component flows from a storage container 319 through a pipe 320 into a metering pump 321 and from there through a pipe 322 to the mixing head 318 where it is mixed with the preliminary mixture to form the reaction mixture. The finished reaction mixture is finally introduced into a molding tool 323. If the preliminary mixture is to be temporarily stored, it flows through the three way tap 316 and the pipe 324 into a buffer container 325 which is equipped with a stirrer 326 to prevent separation of the contents into its components. When the buffered reserve is required for use, the three way tap 316 is adjusted to connect pipes 315 and 317. The tap 327 at the bottom of the buffer vessel 325 is opened and the preliminary mixture is returned through a pipe 328 to the metering pump 314 which delivers it into the mixing head 318 by way of the pipes 315, 317.

What is claimed is:

1. An apparatus for mixing foam forming reactants comprising:
   (A) storage containers for foam producing reactants,
   (B) metering pump means,
   (C) mixing head means for mixing said reactants,
   (D) first conduit means leading from one of said storage containers via said metering pump means to said mixing head means to convey reactants thereto,
   (E) moving film forming means having surface means thereon and film applicator means for applying a film of liquid reactant to said surface means,
   (F) second conduit means connected to another of said storage containers and communicating with said applicator means for supplying a reactant thereto,
   (G) aggregate feed means associated with said surface means for applying an aggregate material to said surface means,
   (H) collecting means located at one end of said surface means for collecting liquid-aggregate mixture, and
   (I) third conduit means including metering pump means for conveying said mixture to said mixing head.

2. The apparatus of claim 1, characterized in that said surface means is formed as an inclined plane down which the material flows.

3. The apparatus of claim 1, characterized in that said surface means is in the form of a funnel.

4. The apparatus of claim 1, characterized in that said surface means is formed by an endless conveyor belt.

5. The apparatus of claim 1, characterized in that a second applicator means is associated with said surface means and disposed so that said aggregate feed means is disposed between said first and second applicator means in the direction of flow.

6. The apparatus of claim 1, characterized in that said surface means is inclined.

7. The apparatus of claim 6, characterized in that the inclination of said surface means is adjustable.

* * * * *